No. 796,097. PATENTED AUG. 1, 1905.
O. WIEDERHOLD.
BUNSEN BURNER.
APPLICATION FILED NOV. 4, 1901.
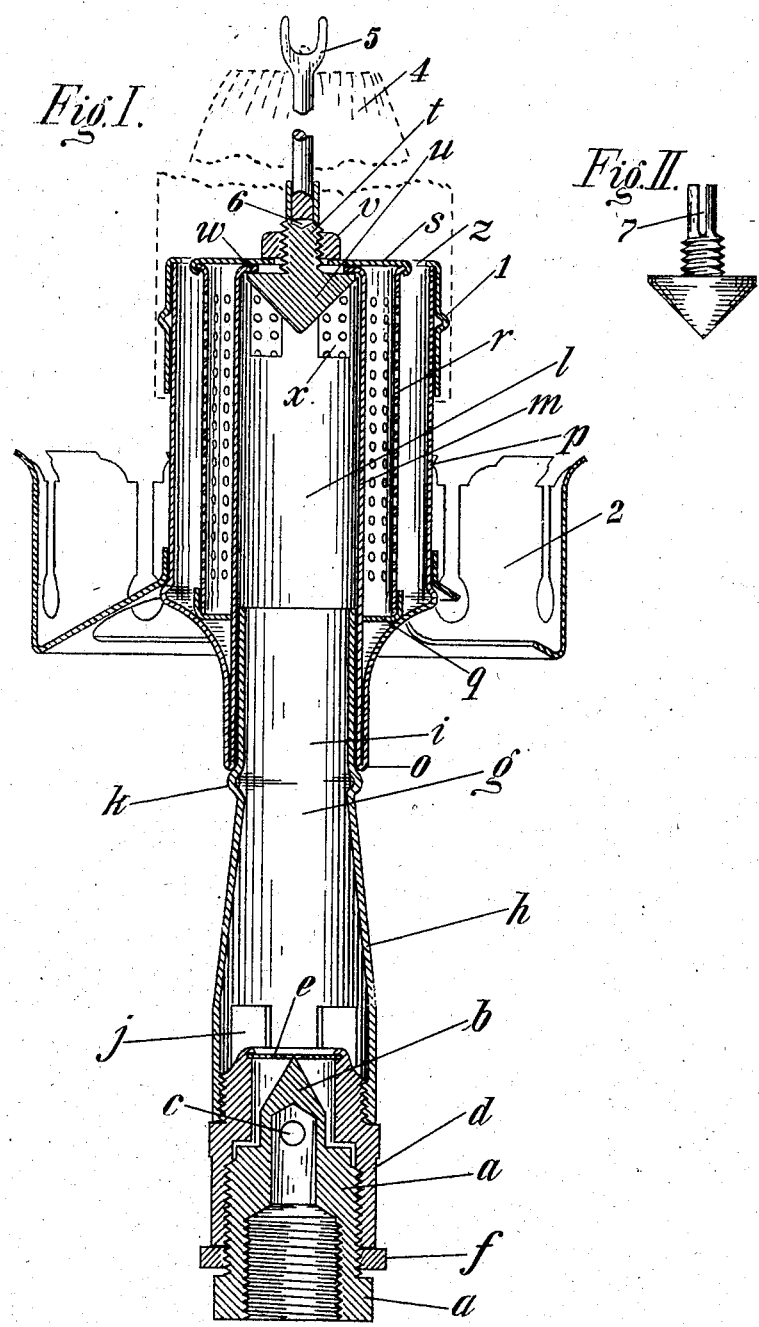

UNITED STATES PATENT OFFICE.

OSCAR WIEDERHOLD, OF BLOOMFIELD, NEW JERSEY.

BUNSEN BURNER.

No. 796,097.      Specification of Letters Patent.      Patented Aug. 1, 1905.

Application filed November 4, 1901. Serial No. 81,003.

*To all whom it may concern:*

Be it known that I, OSCAR WIEDERHOLD, a citizen of the United States, residing at Bloomfield, Essex county, New Jersey, have invented certain new and useful Improvements in Bunsen Burners, of which the following is a specification.

My invention relates to Bunsen burners especially adapted for incandescent gas-lamps.

In the accompanying drawings I have shown by way of illustration a burner in which one form of my invention is embodied.

In the drawings, Figure I is a transverse sectional elevation of the lamp, and Fig. II is a side view of the spreader for dispersing the air-and-gas mixture to the distributing devices.

I will describe this form of my invention minutely, it being understood that this form is shown by way of illustration merely and it also being understood that when I refer herein to "gas" I mean to include any analogous or equivalent fluid.

In the drawings, $a$ indicates a connecting-nipple terminating at its upper end in a conical projection $b$ in the nature of a needle-valve, which conical projection is apertured laterally with aperture $c$, (one only of which is shown.) The nipple $a$ is surmounted by nipple $d$, screw-threaded thereon, which nipple $d$ is provided with a thin plate $e$ spun therein and centrally apertured to receive the point of the valve-cone $b$. By screwing the nipple $d$ up or down upon the nipple $a$ the extent of entrance of the cone $b$ into the central aperture of the plate $e$ may be regulated, thereby regulating the flow of gas.

In order to maintain the nipple $d$ in its adjusted position, a jam-nut $f$ is screw-threaded on the nipple $a$. The nipple $d$ is surmounted by a feeder-tube $g$, whose lower end $h$ is made conical and the upper end $i$ with substantially parallel walls, preferably cylindrical. The lower end of the feeder-tube is provided with lateral air-inlet apertures $j$, the feeder-tube with a circumferential bead $k$. Surmounting the feeder-tube are the mixing devices and glassware and mantle support of the lamp. It is to be understood, however, that the glassware is not essential. The feeder-tube delivers into a mixing-chamber $l$, shown in the present instance as a shell $m$, of a general cylindrical form, folded upon itself at its bottom $o$ and extending upward to form the outer casing $p$ of the mixing device. Loosely surrounding the shell $m$ is a thimble $q$, which is adapted to rest against the lower portion of the outer shell $p$. This thimble $q$ embraces the lower end of a sieve $r$ and is adapted to be frictionally bound thereto. The upper end of the sieve $r$ is formed by a solid portion $s$, apertured for the passage of a screw $t$, which carries at its lower end a spreader $u$, which spreader is shown in the present instance as of a general conical form. A suitable nut $v$ is provided to hold the parts together, the upper turned-over edge $w$ of the shell $m$ engaging above the rear face of the conical spreader, so that by turning the nut $v$ the sieve will be firmly held in place surrounding the mixing-chamber $l$. The shell $m$ of this mixing-chamber $l$ is laterally apertured. In the present instance these lateral apertures $x$ are shown as at the upper end of the mixing-chamber. The annular orifice $z$ is formed by the upper edge of the sieve and the upper edge of the casing $p$. A cap 1 is adapted to surround the upper end of the outer shell $p$, and a suitable gallery 2 may be provided for the glassware.

My burner is principally designed to be used in connection with a mantle 4, having a center rod 5, which center rod is socketed in a socket 6, formed in the upper end of the screw $t$. This socket 6 is laterally slotted, as shown at 7, so that the socket may be pinched together to clamp the rod firmly, and upon breakage of the rod (which is ordinarily made of lava or the like) the part remaining in the socket may be readily removed, preferably by splaying the sides of the socket apart slightly and introducing an instrument through the slots thereof.

The operation of the construction shown may be said to be as follows: The gas is admitted through the opening $c$ of the regulator and passes upward into the feeder-tube $h$, air entering the burner through the lateral apertures $j$ in the feeder-tube. Naturally the richest gas or the mixture containing the most gas is in the center of the mixing-tube, and it is one of the objects of my present invention to produce means whereby this rich gas mixture may be efficiently distributed to the outside of the flame, so that it will burn on the outside of the Bunsen flame next to the mantle, where it can get the most oxygen from the air to insure perfect combustion. This is effected as follows: The air-and-gas mixture passes upward into the mixing-chamber, being given a powerful movement of propulsion, owing to the shape of the feeder-tube. In the mixing-chamber the speed of this air-and-gas mixture is slightly checked, and it passes laterally outward through the apertures $x$, being deflected and distributed by the cone-shaped spreader $u$. As the gas passes through the openings in the shell of the mixing-chamber it impinges upon the cylindrical sieve. In consequence of this construction the richest gas mixture which passes up the center is deflected outwardly against the top openings of the sieve, and that which passes up the sides of the mixing-chamber passes out through the lower portions of the apertures in the mixing-chamber shell, so that it gets a downward movement between the mixing-chamber and the perforated shell or sieve. As this outside portion of the air-and-gas mixture has less velocity than the center portion, it passes upward immediately on the outside of the sieve, burning on the inside of the Bunsen flame. The mixture from the center of the mixing-chamber by reason of its higher velocity is thrown downward by the spreader and burns on the outside of the Bunsen flame. It will also be observed that theoretically the higher the gas-pressure the greater is the resistance of the poor-mixture gas in passing by the rich-mixture gas as it comes out of the top of the sieve. Thus naturally the burner mixes its gas and air automatically, and consequently it does not require an air-shutter. Hence there is no blackening of the mantle, arising from imperfect combustion.

It will be observed that the upper cylindrical portion $i$ and the lower conoidal portion $h$ are of substantially equal lengths—that is to say, that the length of one is not greatly in excess of that of the other.

Having described my invention, what I claim, and desire to secure by Letters Patent, is—

1. In a Bunsen burner, the combination, of suitable means for distributing the air-and-gas mixture to the flame, a suitable mixing-chamber and a feeder-tube for delivering the air and gas to the mixing-chamber at a high velocity, the said feeder-tube being substantially straight throughout its upper portion and conoidal throughout its lower portion, the said conoidal portion being of considerable extent combined with a regulator delivering the gas centrally of the said feeder-tube.

2. In a Bunsen burner, the combination of a delivery-tube of tapering form, a regulator delivering gas centrally of the bore of the said tube, a mixing-chamber closed at the top and apertured at the top laterally for the lateral delivery of air-and-gas mixture, and a spreader located within and at the top of the said mixing-chamber opposite the apertures therein and adapted to project the central, more rapidly moving portion of the mixture-column laterally to effect delivery thereof, at the outside of the Bunsen flame substantially as described.

3. In a Bunsen burner, the combination of a mixing-chamber having at its top lateral gas-delivery openings, a spreader in rear of the said gas-delivery openings at the top of the mixing-chamber and adapted to spread the gas laterally thereto, said spreader being of such form as to project the central, more rapidly moving portion of the mixture-column laterally, and a foraminous screen or casing surrounding the apertured portion of the said mixing-chamber whereby the richest portion of the mixture will be delivered at the outside of the Bunsen flame.

4. In a Bunsen burner, the combination of a suitable mixing-chamber and a feeder-tube for delivering the air and gas to the mixing-chamber at a high velocity, the said feeder-tube being substantially straight throughout its upper portion and conoidal throughout its lower portion, the said lower portion being in extent about one-half of the length of the tube, combined with means for delivering gas centrally of the said feeder-tube, a mixing-chamber to which the said feeder-tube delivers, said mixing-chamber being provided at the top with lateral gas-delivery openings and closed at the top and provided with means projecting downwardly from the top in rear of the said gas-delivery openings adapted to deflect the central, richest portion of the gas-and-air mixture laterally to effect the burning thereof at the outside of the Bunsen flame.

5. In a burner, the combination of a mixing-chamber having means for deflecting the air-and-gas mixture laterally and a feeder-tube for delivering the air-and-gas mixture to the mixing-chamber at a high velocity, comprising a substantially straight upper portion $i$ and a conoidal lower portion $h$, the said portions $i$ and $h$ being of substantially equal length, and means for delivering the gas to the conoidal portion and for receiving air laterally into the conoidal portion.

OSCAR WIEDERHOLD.

Witnesses:
  MILAN DAY BARNES,
  GEO. E. MORSE.